United States Patent [19]

Mencke

[11] Patent Number: 4,622,258

[45] Date of Patent: Nov. 11, 1986

[54] CONTACT LENS CLEANING ARTICLE

[75] Inventor: Arlene J. Mencke, St. Paul, Minn.

[73] Assignee: Minnesota Mining and Manufacturing Company, St. Paul, Minn.

[21] Appl. No.: 729,288

[22] Filed: May 1, 1985

Related U.S. Application Data

[62] Division of Ser. No. 484,163, Apr. 12, 1983, Pat. No. 4,533,394.

[51] Int. Cl.$^4$ ................................................ B32B 5/14
[52] U.S. Cl. .................................. 428/171; 15/104.92; 15/104.93; 428/288; 428/290; 428/297; 428/903
[58] Field of Search ............... 428/171, 289, 290, 903, 428/288, 297; 15/104.92, 104.93

[56] References Cited

U.S. PATENT DOCUMENTS

| | | | |
|---|---|---|---|
| 3,056,998 | 10/1962 | Ebner | 15/512 |
| 3,063,083 | 11/1962 | Obitts | 15/214 |
| 3,150,406 | 9/1964 | Obitts | 15/512 |
| 3,177,055 | 4/1965 | Ruckle et al. | 134/18 |
| 3,406,418 | 10/1968 | Hurley | 15/104.93 |
| 3,954,642 | 5/1976 | Schwuger | 15/104.93 |
| 4,013,576 | 3/1977 | Loshaek | 252/106 |
| 4,046,706 | 9/1977 | Hrezanoski | 252/106 |
| 4,065,324 | 12/1977 | Rankin | 134/30 |
| 4,104,187 | 8/1978 | Sibley et al. | 252/106 |
| 4,127,423 | 11/1978 | Rankin | 134/30 |
| 4,187,574 | 2/1980 | Wrue | 15/104.92 |
| 4,307,143 | 12/1981 | Meitner | 15/104.93 |
| 4,328,279 | 5/1982 | Meitner et al. | 478/289 |
| 4,354,952 | 10/1982 | Riedhammes et al. | 252/106 |
| 4,357,173 | 11/1982 | Rosenthal et al. | 134/21 |

FOREIGN PATENT DOCUMENTS

| | | |
|---|---|---|
| 0063472 | 4/1982 | European Pat. Off. . |
| 82105427 | 12/1980 | Japan . |
| 2055118 | 2/1981 | United Kingdom . |

OTHER PUBLICATIONS

H. R. Lutes, "Caring and Handling of Contact Lenses", *Optometric World*, vol. 55, No. 11, (1968).

*Primary Examiner*—James J. Bell
*Attorney, Agent, or Firm*—Donald M. Sell; James A. Smith; Lorraine R. Sherman

[57] ABSTRACT

An article and a method for cleaning a contact lens is disclosed, said method comprising providing a moistened non-woven fibrous web wherein the average fiber diameter is up to 50 microns, contacting and rubbing the lens with the fibrous web, and removing the lens from contact with the fibrous web.

25 Claims, No Drawings

CONTACT LENS CLEANING ARTICLE

This is a division of application Ser. No. 484,163, filed Apr. 12, 1983, now U.S. Pat. No. 4,533,394.

TECHNICAL FIELD

This invention relates to a fabric article for cleaning a contact lens and a method for its use.

BACKGROUND OF THE INVENTION

Both hard and soft contact lenses require regular and careful cleaning in order to maintain their usefulness. In particular, the cleansing techniques employed must preserve the efficacy and safety of the lens.

To remain efficacious, the structural integrity and optical clarity of a lens must be maintained. Maintenance of optical clarity requires that the lens not be obscured by foreign substances, that is, it must be substantially free of deposited substances such as cosmetics, microorganisms, body proteins, body lipids, and the like, which are well known to cause significant clarity problems. Maintenance of the structural integrity of a lens requires the avoidance of gross damage such as fracture, chipping, and both deep and wide scratches. Generally, a lens must be handled gently to avoid fracture or rupture and harmful scratching.

To remain safe in use a lens must fit comfortably in the eye so as to avoid irritation, inflammation, scratching and other damage to the eye, and it must allow the eye to receive sufficient oxygen and other essential substances to maintain normal function. Also, the lens must not be contaminated by microorganisms which will proliferate and infect the eye.

State of the art lens cleaning methods are generally chemical in nature. Contact lens cleaning solutions and compositions are known for both hard and soft contact lenses, and are described, for example, in U.S. Pat. Nos. 4,046,706; 4,013,576; 4,127,423; 4,104,187; 4,354,952 and 4,065,324. The solutions disclosed require soaking and/or heating and/or rubbing of the lens in the fingers or palm of the hand. The inconveniences of soaking and heating are obvious, e.g., additional utensils and equipment are used, a heat source is used, and the lens is not available for use for extended periods of time.

Two major problems created by rubbing in the hand include (1) the surface of the fingers or the hand may be too rough and scratch the lens, and frequently the skin may be soiled with materials which are likely to cause scratching; and (2) the skin is a major source of contamination of the lens by various microbes, oils, dust, chemicals, and the like, which are acceptable on the skin but not in the eye.

Another variation on lens cleaning solutions is disclosed in U.K. patent application No. 2,055,118 A. This application describes a liquid cleaning composition containing an inorganic particulate abrasive and a surfactant. The compositions are limited in their usefulness to silicone-containing contact lenses and other harder lenses and are not suitable for soft contact lenses. When used to clean and remove deposits the methods suggested are immersing, spraying, rubbing, shaking and wiping, but no suggestion of using a non-woven fibrous mat is found. A similar method, disclosed in European Patent Application No. 0 063 472, teaches the use of a cleansing composition comprising organic polymer particulate matter suspended in a carrier for use in cleaning soft and hard contact lenses.

A further variation of lens cleaning methods is found in the use of a kit including sponges or synthetic foam of polyurethane such as are disclosed in U.S. Pat. Nos. 3,063,083 and 4,187,574. It has been found that the sponges of the art suffer from several deficiencies including a lack of abrasive power to remove deposits, a tendency to plug too rapidly with deposited material, a rapid and progressive loss of sterility and a relatively high cost. Another sponge-like product is available in Japan from Toyo Contact Lens Co., Ltd. Such a product is believed to be described in Japanese Kokai No. JP 82,105,427. This product is not known to be available in the United States at this time.

U.S. Pat. No. 4,357,173 describes a lens cleaning method which uses a "cleaning and polishing cloth" together with a polishing material. The cloth is only described as a "conventional polishing cloth" such as velveteen which to one in the art implies a woven cloth. Since the non-woven webs of the invention are not conventional, this reference does not recognize the outstanding properties of such webs.

SUMMARY OF THE INVENTION

It is not known in the contact lens cleaning art to provide non-woven cloths or fabrics to be used without polishing and cleaning material added by the consumer.

The present invention provides a simple, convenient and effective method of cleaning both hard and soft contact lenses. It also provides contact lens fabric cleaning articles of manufacture for use in the method of the invention for a period of time sufficient to loosen proteinaceous and particulate matter from a contact lens.

Briefly, the method of the invention comprises rubbing a contact lens with a moist non-woven fibrous web to clean the lens.

The advantages provided by the method of the invention include convenience, since it can, in some of its preferred embodiments, be practiced at any time the lens becomes soiled as shown by opacity or causes discomfort due to the presence of particulate matter. No special apparatus is required and only a few seconds to a few minutes are necessary to clean the lens.

Additional major advantages of the present invention are the avoidance or reduction of the problems of presently used cleaning methods, i.e., the present invention provides improved removal of lens contaminants, reduced and minimized contact of the lens with the skin, improved safety due to improved removal of microbes and the like. Special disinfectants for the lenses are not routinely required in the non-woven webs, although disinfectants can be used if desired.

The articles of the invention may be provided in a variety of forms such as rolls of material, individual pads or groups of pads attached together loosely. They may be dry or premoistened; they may be sterile or non-sterile; they may be unpackaged or packaged in groups or as units.

Presently it is preferred to provide individually packaged premoistened sterile articles which may be disposed of after use. Preferably, the moisture is provided by an aqueous solution which may contain adjuvants such as detergents, surfactants, salts, buffers, hydrotropes, and preservatives. Preferably, the articles are discarded after a single use, since use renders them non-sterile. Alternatively, they can be sterilized by conventional methods to facilitate reuse.

As used in the present application:

"non-woven fibrous web" means a sheet or pad of a non-woven network of fibers;

"microfiber" means a filament structure having an average fiber diameter of up to 10 microns;

"filament" means a fiber of at least 60 cm in length;

"linting" means the tendency of a nonwoven web to contain small, readily detachable fibers;

"pad" means a layer or layers of fibers preferably having a thickness in the range of 0.2 to 7 mm;

"scrim" means a fibrous lightweight woven or non-woven sheet material such as a "spun-bond" scrim which is defined as a material comprised of substantially continuous and randomly deposited, molecularly oriented filaments of thermoplastic polymer as described and defined in U.S. Pat. No. 4,041,203 which is incorporated herein by reference; and "staple fiber" means a fiber having a length of 1.3 cm to 60 cm.

The method of the present invention combines the scrubbing or abrasive action of a fibrous web with the action of a surfactant solution which dissolves loosened proteinaceous and particulate matter. Then the loosened material can be adsorbed very effectively by the web.

The common methods for cleaning contact lenses have two major flaws: (1) there is little scrubbing effect when skin is the "scrub brush", and (2) the solution which should be used to disperse soils removed from the lens runs off the skin and is therefore not very effective in dissolving and removing the soils.

The fibrous mat for cleaning contact lenses described herein contains the two elements which make it an effective device for removal of deposits from the lenses: (1) the fibers provide many "scrubbers" which, through an abrasive action, physically loosen and remove the bound surface deposits and (2) the interstices of the web are filed with and hold a surfactant solution which is then available to solubilize the dislodged soil and remove it from the lens.

The fiber diameter that is most desirable varies with the characteristics of the polymer. If the polymer is very soft and non-rigid, very small diameter fibers will have little strength and will not have good scrubbing ability. A soft, non-rigid polymer can, therefore, be made into a larger fiber diameter than a polymer that is hard and rigid. A polymer which is rigid will have good scrubbing properties at large and small diameters but may cause deleterious scratches on the lens at larger (for example, greater than 10 microns) diameter.

It is generally true that the smaller the fiber diameter, the smaller the scratch the fiber can cause; therefore, the smallest fibers (i.e., up to 10 microns) are the most desirable. The characteristics of the polymer material from which the fibers are made also determine whether the fibrous mat is acceptable for use in cleaning a contact lens. It has been observed that fibers having a diameter of 50 microns can be used to clean a contact lens without causing deleterious scratches.

The best fiber diameter is, therefore, a characteristic of the fibrous mat which must be determined for each type of polymer.

DETAILED DESCRIPTION OF THE INVENTION

The present invention provides a method for cleaning contact lenses in which a lens is rubbed with a moistened, mildly abrasive, non-woven, fibrous web of a suitable material in order to remove any deposited substance.

The rubbing method of the invention includes any of the following: (1) surrounding the lens with the web and rubbing, (2) fixing the lens in place with a holding means and rubbing the web over it, and (3) providing a web holding means such as a solid support system and rubbing the lens over it. Holding the lens in a hand and rubbing the web over it is also envisioned, but if this method is used it is desirable to hold the lens in such a manner as to minimize contact of the skin with the lens.

The fibrous web has an average fiber diameter of up to 50 microns, preferably up to about 20 microns, and most preferably up to 10 microns in order to avoid deep-scratching of lenses which consist of relatively more readily scratchable materials. Preferably, the moistened, non-woven, fibrous web contains a surfactant to assist in maximizing its effectiveness in a cleaning method.

The structure of materials useful in the lens cleaning non-woven fibrous web compositions of the invention are quite varied. Non-woven, microfibrous webs are preferred. Non-woven webs have several advantages over woven materials including ease of manufacture, low material cost, and allowance for variation in fiber texture and fiber density.

Fibrous webs of the invention are prepared by methods known in the art. Non-woven form webs may be prepared by melt-blowing as is known to those skilled in the art and described in, for example, U.S. Pat. No. 3,978,185 and V. A. Wente et al. "Manufacture of Superfine Organic Fibers", Naval Research Laboratories Report No. 4364, Naval Research Laboratories, Washington, D.C. (U.S. Document No. 111437) which are incorporated herein by reference. Alternative techniques such as solution-blowing can also be used as described, for example, in U.S. Pat. No. 2,571,457, which is incorporated herein by reference. The method used to prepare the non-woven material is not critical.

The materials useful to prepare non-woven fibrous web compositions of the invention include polymers and copolymers of monomers which form fibrous webs. Suitable polymers include polyalkylene such as polyethylene and polypropylene, polyvinyl chloride, polyamides such as the various nylons, polystyrene, polyarylsulfones, polyesters such as poly(ethylene terephthalate), and polyurethanes such as polyether polyurethanes. The fibrous webs are in non-woven form because of ease in processing and their reduced cost. Non-woven webs may also be prepared from combinations of co-extruded polymers such as polyester and polyalkylenes. Copolymers of these polymers are also included within the scope of the invention. Non-woven webs may also be combined webs which are an intimate blend of fine fibers and crimped staple fibers.

Among these fibers polyethylene has an advantage over polypropylene since it is readily sterilized by gamma radiation. Polyethylene terephthalate has an advantage over the other fibers in that it provides very low linting after conventional non-woven processing. Polypropylene, polystyrene, polyethylene, polyesters and other web-forming fibers may be processed by methods known as embossing and pillowing to provide very low linting.

Embossing is the process of heating a non-woven web at a temperature below its melting point while pressing it to form a patterned structure which is generally stronger and more rip-resistant and reduces linting.

Pillowing of non-wovens is described in detail in U.S. Pat. Nos. 4,042,740 and 4,103,058. The non-wovens of these patents are preferred in the present invention. Embossed or pillowed non-woven webs are most preferred as compositions of the invention.

The size of the fiber diameter and the chemical composition of the fiber must be considered when selecting a material for the web. If the characteristics of the polymer are such that it can scratch the lens material, it may be useful only when the fiber diameter is very small, so small that it does not cause significant scratching of the lens. In order to remove proteins, lipids, and other biologically originated contaminants from the lenses it has been found advantageous to use fibers with a relatively small diameter, i.e., a diameter qualitatively similar to that of the contaminants such as viruses and bacteria (which generally have a diameter in the micron range), and agglomerates of mucin with other proteins and lipids which generally form in the eye. In view of the lack of polishing and cleaning cloths available for consumer use on contact lenses, it is surprising that non-woven webs with an average fiber diameter of less than about 50 microns, preferably less than 20 microns, and most preferably up to 10 microns are most useful. Of course, the fibers will vary in diameter greatly depending upon variations in the manufacturing process. Average fiber diameters in the range of 0.5 to 50 microns are generally acceptable to provide efficacious cleaning.

It is also important to maintain fiber diameter below 50 microns to provide safe and effective cleaning and thereby minimize harmful scratching of the lenses. In view of the lack of suitable contact lens cleaning fabrics or cloths in the marketplace, it was surprising to find that the non-woven webs of the present invention do not produce unacceptable scratching of the lenses. It is known in the contact lens art that lenses gradually become scratched and damaged in normal handling and use. Hard contact lenses eventually become scratched such that vision is impeded and/or the comfort of the wearer is reduced. Lenses which are sratched may in some cases be grindable or polishable to renew their usefulness. Grinding and polishing are abrasive processes. It is believed that scratches that are very small, i.e., short and/or shallow will approximate grinding and polishing and they will not impair clarity of vision and not cause physical discomfort.

Surprisingly, it has been found in the present invention that the use of mildly abrasive fibrous webs of small fiber diameter of less than 50 microns average fiber diameter do not produce unacceptable scratching when used in cleaning lenses. It is considered to be important to minimize the number of globs (lumps of polymeric material which were not extruded into fiber form) in the webs of the inventions, since these could be the source of scratches which, if not limited, may gradually reduce the clarity or comfort of the lens.

The wet fibrous webs of the present invention can be used without added agents in their most simple and least expensive form. It is preferred that a surfactant be added to aid in the cleaning process by facilitating interaction between the fibers of the webs and the lens contaminants to be removed and by dispersing in solution the contaminants removed by the abrasive action of the fibers. The surfactant, which is used in an aqueous medium, may be part of the manufactured product as delivered to the user, or it may be added by the user. Anionic, cationic, amphoteric, and nonionic surfactants can all be used, and in some cases combinations of either an anionic or a cationic surfactant with a nonionic surfactant are useful. Some examples of suitable surfactants are anionics, such as:

(1) Sodium lauroyl sarcosine, Hamposyl TM L30 (W. R. Grace Co., Nashua, NH),
(2) Sodium dodecyl sulfate,
(3) Disodium alkyl amidoethoxy sulfosuccinate, Aerosol 413 (American Cyanamid Co., Wayne, NJ),
(4) Disodium ethoxylated akylamide sulfosuccinate, Aerosol 200 (American Cyanamid Co.),
(5) Salt of lipoaminoacid, Lipoproteol TM LCO (Rhodia Inc., Mammoth, NJ),
(6) Disodium mono-oleamido polyethylene glycol-2-sulfosuccinate, Standapol TM SH 135 (Henkel Corp., Teaneck, NJ),
(7) Half ester succinate, 25% concentration, Fizul TM 10-127 Finetex Inc., Elmwood Park, NJ), and
(8) Sulfosuccinate of ethoxylated lauryl alcohol, Cyclopol TM SBFA 30 (Cyclo Chemicals Corp., Miami, FL);

cationics, such as:
(9) Polyethylene glycol-15 tallow polyamine, Polyquart TM H (Henkel Corp.);

amine oxides, such as:
(10) Cocamidopropylamine oxide, Standamox TM CAW (Henkel Corp.), and
(11) Myristamine oxide, Barlox TM H (Lonza Inc., Fairlawn, NJ);

amphoterics; such as:
(12) N-lauryl myristyl beta amino propionic acid, Deriphat TM 170C (Henkel Corp.),
(13) Cocamido sulfobetaine, Lonzaine TM JS (Lonza, Inc.),
(14) Dicarboxylic coconut derivative, disodium salt, salt-free, Miranol TM C2M-SF (Miranol Chemical Co.Inc., Dayton, NJ);
(15) Substitutent inidazole, Amphoterge TM W2 (Lonza, Inc.), and
(16) Modified amphoteric, Amphoterge TM 2WAS (Lonza, Inc.);

and nonionics, such as:
(17) Alkylaryl polyether alcohol, octylphenol series (X=9-10), Triton TM X-100 (Rhom and Haas Co., Philadelphia, PA),
(18) Polyoxyethylene (2) cetyl ether, Brij TM 52 (ICI Americas; Wilmington, DE), (19) Sorbiton monolaurate, Span TM 20 (ICI Americas),
(20) 5 mole ethylene oxide soya sterol, Generol TM 122 E5 (Henkel Corp.),
(21) Fluorochemical surfactant, Fluorad TM (3M Co., St. Paul, MN),
(22) Alkylaryl polyether alcohol, nonylphenol series (X=4), Triton TM N-42 (Rohm and Haas Co.),
(23) Alkylaryl polyether alcohol, nonylphenol series (C=9-10), Triton TM N-101 (Rohm and Haas Co.),
(24) Alkylaryl polyether alcohol, octylphenol series (X=40), Triton TM X-405 (Rohm and Haas Co.),
(25) Polyethylene oxide (20) sorbitan monooleate (polysorbate 85), Tween TM 80 (ICI Americas),
(26) Polyethylene oxide (20 sorbitan trioleate (polysorbate 85), Tween TM 85 (ICI Americas),
(27) Polyoxyethylene (10) cetyl ether, Brij TM 56 (ICI Americas),
(28) Condensate of ethylene oxide with hydrophobic bases formed by condensing propylene oxide with propylene glycol, solid, Pluronic TM F-68 (BASF Wyandotte, Wyandotte, MI), and

(29) Condensate of ethylene oxide with hydrophobic bases formed by condensing propylene oxide with propylene glycol, liquid, Pluronic ™ F-127 (BASF Wyandotte).

It has been found that non-woven fibrous webs containing anionic surfactants are superior for promoting the removal of lipids in the method of the invention. Surfactant loadings of from 0.01 weight percent to 25 weight percent of the fibrous web have been used. Relatively little benefit is added when the surfactant level is raised above 1.0 weight percent for the preferred anionic surfactants of the invention such as the sarcosinate type surfactants, e.g., Hamposyl ™ L30. For this reason loadings of 0.01 to 1.0 weight percent of surfactant are preferred.

Anionic surfactants are particularly preferred when used in combination with polypropylene or polyester fibrous webs.

The fibrous webs of the invention are used in a liquid-moistened environment. In use, the web itself is moistened, the lens may alternatively or in addition be moistened, or if so desired, the cleaning may be done on an immersed lens. It may also be convenient or useful to rinse the lens and fabric during or after the cleaning process, although this is not required in the method of the invention. The moistening agent is generally water or primarily an aqueous solution, e.g., a soft lens can be moistened with saline solution, but these solutions may contain adjuvants, for example surfactants, disinfectants, antimicrobial agents, hydrotropes, buffers, and the like. If a cleaning solution is used with the fibrous web of the invention the cleaning of the lens if facilitated since the web can hold the solution in place so that it is available to disperse the lens contaminants to be removed.

Alternative solvents may be selected and used in conjunction with aqueous solutions or instead of aqueous solutions. For example lower alkanols, acetone, and the like, may be used if the solvents selected are removed from the lens before reusing it and/or they are physiologically acceptable to the eye and not damaging to the lens.

Non-woven, fibrous webs are useful in various size, shape, and packaging alternatives. A roll of non-woven, fibrous pads with or without a dispenser can be provided. Each single pad used to clean a lens may be packaged individually, or groups of pads may be packaged together. Large pads may be scored for subdivision by the user.

The non-woven, fibrous web may be provided in sterile or non-sterile form. It is preferred that the web be sterilized and delivered in a sterile state to the user. Sterile packaging is necessary to maintain sterility of the web, as is known to those skilled in the art. The packaging requirements will also vary depending upon whether the non-woven, fibrous web is provided moist or dry.

Sterility of the pads may be obtained using any conventional sterilization technique. It has been found particularly convenient to sterilize an already packaged pad with standard gamma ray techniques. Other sterilization methods include ethylene oxide treatment and autoclaving.

The sterilization method is varied depending on whether the web is dry or wet; the solvents present (if the web is wet); the presence, absence or type of surfactant; the type of fibrous web material; and the presence, absence, and type of packaging, as is known to those skilled in the art.

A preferred embodiment is a single moist non-woven, fibrous pad optionally loaded with surfactant in water and preferably packaged and then sterilized. If the packaging is, for example, aluminum foil with a backing, preservatives may not be necessary. A preservative is optionally added to extend the useful life of the product.

The density of the fibrous web will be a variable and places a limit on the size of the fibrous web pad. Generally non-wovens with web density of about 80 percent to about 97 percent voids are useful in the method of the invention. Preferably there are at least 90 percent voids in order to allow the lens contaminant to be at least partially removed into the interstices of the fibrous web as the rubbing process proceeds. Webs of less than 80 percent voids have fibers packed very tightly and have been extruded under high pressure so that the webs become hard and abrasive and have sufficient open volume to accommodate proteinaceous and particulate contaminants. An advantage of the fibrous webs of the invention is the increased surface area available to adsorb lens contaminants. Generally the web pads are sufficiently large to surround the lens front and back and allow the user to rub the lens, preferably with a radial motion without touching the lens. The size of pads necessary to clean a lens will generally be in a range of about two centimeters wide and about five centimeters long. It will be readily apparent to the skilled observer that these dimensions may be varied without departing from the spirit of the invention. The thickness of the fibrous pad is a variable that depends upon the web density, the tear strength of the pad under the conditions both of manufacture and of use, the web material used, and the conditions of use. A minimum useful thickness is about 0.2 mm, and thicknesses up to one centimeter may be used. The preferred thickness range is 0.4 to 5 millimeters for polyester, polyethylene, and polypropylene pads. The shape of the pads may be rectangular, square, triangular, irregular or other. Pillow-webbed pads are 0.4 to 1.0 mm in thickness, and preferably about 0.5 mm thick.

Surprisingly, both hard and soft contact lenses may be effectively and safely cleaned using the method and compositions of the invention. Lenses of the methyl methacrylate, silicone methacrylate, hydroxyethyl methacrylate, and fluorinated polyether type polymers have all been cleaned effectively using the method of the invention. This cleaning is achieved without significantly damaging the lens.

Another variation of the invention is to provide the fibrous pad with a backing which is flexible or rigid. This variation can be used to further isolate the skin of the fingers from the pad and any solution optionally present in the pad. Alternatively, a backing is used to provide rigidity to a web. Such backings can be widely varied and include foils such as aluminum foil, polymeric films, formed cups of polymeric materials, and other synthetic or natural materials. The backing can be attached by conventional adhesive or mechanical methods.

Another alternative is to provide the fibrous pad with a handle. The pad can optionally be contoured to fit on the end of the handle, or it can be contoured to match the shape of a lens. One option would be a smaller contoured pad covering the end of a rod which could be used to scrub the lens to effect cleaning.

The fibrous webs of the present invention may be "scrimmed" using standard techniques as described in patents such as U.S. Pat. No. 4,041,203 incorporated herein by reference, to provide webs with increased strength and reduced linting. It is envisioned within the scope of the present invention that a layer of scrim could be adhered or embossed on one or both surfaces of a fibrous pad.

The melt-blowing technique was used to prepare most of the non-woven fibrous webs of the Examples. All fibrous webs used in the Examples had at least 80 percent voids.

Objects and advantages of this invention are further illustrated by the following examples, but the particular materials and amounts thereof recited in these examples, as well as other conditions and details, should not be construed to unduly limit this invention.

EXAMPLE 1

Evaluation of sliding of surfactant solution-treated fibrous web pads on soft contact lens material A 1.4 mm thick, 5.1 cm by 3.8 cm, hydrated hydroxyethyl methacrylate polymer sample (lens material) was moistened with a surfactant-containing test solution, then rubbed against a fibrous web which had been soaked with the same solution. Two rubbing motions were tested, (a) back and forth and (b) circular. Three surfactant-containing test solutions were used: (1) Allergan TM Cleaning and Disinfecting Solution (Allergen Pharmaceuticals, Inc., Irvine, CA), (2) Allergan TM LC-65 (Allergan Pharmaceuticals, Inc.) and (3) Allergan TM "Clean 'N Soak" (Allergan Pharmaceuticals, Inc.).

A score was assigned to each trial on a scale of 1 to 3 with "1" indicating noticeable roughness and resistance to sliding, "2" slight resistance to sliding and "3" (most desirable) indicating no resistance to sliding. The data are shown in TABLE I below.

TABLE I

| Non-woven web material (fiber diameters up to 25 microns) | Score for Solutions (back and forth/circular) Trials | | |
|---|---|---|---|
| | solution 1 | solution 2 | solution 3 |
| polyethylene | 1/1 | 1/1 | 1/1 |
| poly(ethylene terephthalate) | 2/2 | 3/3 | 3/3 |
| poly(ethylene terephthalate) (with sodium benzoate) | 3/2 | 3/3 | 3/3 |
| polyethylene/poly(ethylene terephthalate) mixture bicomponent web | 2/2 | 2+/2+ | 2/2 |
| polypropylene/poly(ethylene terephthalate) staple fiber* (combined web) | 2/2 | 2+/2+ | 2/2 |
| polyurethane (of methane diphenyl diisocyanate and tetramethylene glycol) | 2/2 | 3/3 | 2+/2+ |
| embossed polyethylene/polypropylene mixture | 1/1 | 2/2 | 2/2 |
| nylon 6 | 2+/2+ | 3/3 | 2+/2+ |
| nylon 6 variation | 2+/2+ | 2+/2+ | 2/2 |
| poly(ethylene terephthalate)/polypropylene pillowed | 2/2 | 2+/2+ | 2+/2+ |
| polybutylene | 1/1 | 1/1 | 2+/2+ |

*40μ fiber diameter

The results of TABLE I show that solutions (2) and (3) provide the best lubrication for the webs shown when used to clean hydroxyethyl methacrylate samples. There was no significant difference in the result obtained using back and forth vs. circular scrubbing motions.

EXAMPLE 2

Embossing of fibrous web pads

A poly(ethylene terephthalate) blown microfibrous web of approximately 1.5 mm thickness, optionally folded into several thicknesses, was passed through a high intensity sheeting roll apparatus at various temperatures. A rubber nip roller was used to control the pressure applied. A pattern of small hexagons was embossed. The webs produced are shown in the TABLE II.

TABLE II

| Trial | Temperature (°F.) | Temperature (°C.) | Pressure kg/cm² | Layers | Roll speed (meters per minute) | Web produced |
|---|---|---|---|---|---|---|
| 1 | 210 | 99 | 1.4 | 4 | 5.5 | stiff web |
| 2 | 185 | 85 | 0.7 | 4 | 5.5 | stiff web |
| 3 | 160 | 73 | 0.7 | 2 | 5.5 | moderately stiff web, poor pattern on nip side |
| 4 | 150 | 66 | 0.7 | 2 | 5.5 | inadequate pattern on nip side |
| 5 | 150 | 66 | 0.7 | 1 | 5.5 | too thin |
| 6 | 150 | 66 | 0.7 | 2 | 5.5 | good softness, pattern on nip side could be better |
| 7 | 150 | 66 | 3.5 | 2 | 5.5 | good softness, good pattern |

The results of TABLE II show that successful embossing of fibrous web pads is dependent upon temperature, pressure, layers present, and roll speed used. Embossed webs provided superior cleaning when made into webs of the invention.

EXAMPLE 3

Loading of surfactant on fibrous webs

Solutions of 1.0 and 0.5 weight percents of surfactant in 95 percent aqueous ethanol were prepared. Pads of microfibrous web (estimated less than 10 micron diameter fibers) about 4.8 mm thick and 2.5 cm by 5.1 cm in size were cut and weighed. Each pad was soaked with a measured volume (1 ml) of surfactant solution and dried completely. Drying was in the open air for about two hours and finally in an evacuated chamber for about 16 hours. The surfactants used and amounts loaded are shown in the following TABLE III:

TABLE III

| Trial | Web material | Surfactant | Percent loading |
|---|---|---|---|
| 1 | nylon 6 | 1% Amphoterage TM W2 | 8 |
| 2 | nylon 6 | 1% Brij TM 56 | 10.7 |
| 3 | nylon 6 | 1% Triton TM X100 | 13.4 |
| 4 | nylon 6 | 1% Tween TM 85 | 9.3 |
| 5 | nylon 6 | 1% Pluronic TM F68 | 10.2 |
| 6 | nylon 6 | 0.5% Amphoterage TM W2 | 5.0 |
| 7 | nylon 6 | 0.5% Brij TM 56 | 4.7 |
| 8 | nylon 6 | 0.5% Triton TM X100 | 4.9 |
| 9 | nylon 6 | 0 5% Tween TM 85 | 7.9 |
| 10 | nylon 6 | 0.5% Pluronic TM F68 | 5.4 |

The results of TABLE III show that different surfactants are useful in preparing webs and the percent loading is substantially proportional to the amount applied.

When used to clean lenses the materials of trials 1 to 10 gave good results.

EXAMPLE 4

Comparison between cleaning with pads and cleaning by rubbing with fingers

Discs of 12 mm diameter and about 0.2 mm thickness were cut from a sheet of a polymeric lens material which was prepared as described in Example No. 10 of U.S. Ser. No. 340,473, filed Jan. 18, 1982, from 82.5 g of perfluoropolyether monomer, 10.0 g of methyl methacrylate, 7.5 g of N-vinylpyrrolidone and 0.5 g of 2,2-diethoxyacetophenone by irradiating under an ultraviolet lamp for one hour. Forty of these discs were placed individually in vials containing 1 ml of "artificial tears". Artifical tears are composed of 1 ml of the aqueous tear solution and 0.01 ml of lipid tear solution. The aqueous tear solution contained the following components for each liter of aqueous solution:
8.4 g sodium chloride
0.08 g calcium chloride
1.38 g sodium phosphate
0.075 g glutamic acid
1.7 g lysozyme (hen egg white)
3.9 g bovine serum albumin
1.05 g gamma globulin (bovine)
0.24 g mucin (porcine submaxillary)

The lipid tear solution contained 0.1 g oleic acid per ml of light mineral oil.

The vials were incubated at 37° C. in a shaker bath for 3 days, then each disc was removed and placed in 8 ml of culture media containing $10^5$ Pseudomonas aeruginosa per ml. All of the samples were then placed in a 37° C. incubator for 48 hours. The discs were then removed and handled as follows under sterile conditions:

(A) Each of 10 discs was rinsed 5 seconds on each side with "Allergan TM Hydrocare TM Preserved Saline". "Allergan TM Cleaning and Disinfecting Solution" ("solution") was added dropwise (10 drops) to a combined web, i.e., a blown microfibrous (about 10 micron fiber diameter) polypropylene pad having staple poly(ethylene terephthalate) (up to 40 micron fiber diameter) therein (Doodle Duster TM 3M) (3.8 cm×5.1×cm×2.8 mm thick). The pad was folded over the disc and rubbed between glove-covered fingers 20 times. The disc was placed in 1 ml of normal saline solution (hereinafter saline) then scraped with a rubber policeman moistened with the rinsed saline. Saline (1 ml) was added to the fibrous pad to rinse and then the saline was squeezed out. A sample of 100 microliters of the saline rinse obtained from both the disc rinse (Disc Rinse A) and pad rinse (Pad Rinse A) was plated. The samples were incubated at 37° C. to allow the microorganisms present to grow so that they could be quantitated.

(B) The same procedure was followed as in part (A) except no pad was used. Each of 10 discs was rinsed 5 seconds on each side with "Allergan Hydrocare TM Preserved Salin". To each disc, held between glove-covered fingers, was added 10 drops of "solution", and the discs were rubbed 20 times (standard digital rubbing technique). Each disc was placed in 1 ml of saline and the disc was scraped with a rubber policeman moistened with saline. The fingers of the glove were rinsed with 1 ml of saline and the saline was collected. A sample of 100 microliters of the saline rinse of both the disc rinse (Disc Rinse B) and the glove rinse (Glove Rinse B) was plated. The samples were incubated at 37° C. and then colonies of microorganisms were counted.

(C) Controls were run by (1) placing three discs in a mixture of artificial tears and lipid and incubating in sterile culture media, (2) placing three discs in a mixture of artificial tears and lipid and incubating in culture media containing $10^5$ Pseudomonas aeruginosa per ml, and (3) placing three discs from saline in culture media containing Ps. aeruginosa. All discs were scraped, rinsed, plated, and incubated as in (A) and (B).

The data are shown in the following TABLE IV:

TABLE IV

| | Bacterial Colony Counts (cfu[b]/100 microliters) | | | |
|---|---|---|---|---|
| Sample no. | Disc scrapings A | Pad rinse A | Disc scrapings B | Glove rinse B |
| 1 | 24 | about 1500 | TNTC | about 600 |
| 2 | 8 | TNTC[a] | about 600 | about 1600 |
| 3 | 3 | about 800 | 864 | about 1000 |
| 4 | 4 | about 1300 | 586 | about 1000 |
| 5 | 2 | about 1200 | 254 | about 800 |
| 6 | 1 | TNTC | 551 | about 1200 |
| 7 | 6 | about 1400 | 436 | about 1200 |
| 8 | 444 | TNTC | about 1100 | TNTC |
| 9 | about 800 | TNTC | — | about 900 |
| 10 | 8 | about 700 | 383 | TNTC |

Control (1): all three discs gave zero colonies
Control (2): all three gave TNTC
Control (3): all three gave TNTC
[a]TNTC = too numerous to count
[b]cfu = colony forming units The results in TABLE IV show that the use of the fibrous pad to clean a lens infected by bacteria is much more effective than the standard rubbing technique. This can be seen by comparing the number of bacterial colonies in Disc Scrapings A with the number of bacterial colonies found in Disc Scrapings B. Relatively few bacteria were left on the Discs A after the microfibrous pad cleaning.

EXAMPLE 5

Removal of protein by scrubbing

Sixty preweighed discs of soft contact lens material (poly(hydroxyethyl methacrylate) of about 1.27 cm diameter were soaked for eight days in the artificial tears solution described in Example 4 containing known weights of various proteins. The protein was rubbed from the discs by rubbing the discs twenty times either with a pad (2.54 cm×7.62 cm×0.48 cm thick) of poly(ethylene terephthalate) blown microfiber soaked in 5.0 ml of a 0.3 percent solution of Hamposyl TM L-30 (adjusted for 100 percent solids) or an article of polyurethane foam 2.54 cm×7.62 cm×1.2 cm thick soaked with 5.0 ml of 0.05 percent Triton TM N-101 surfactant solution or it was removed by simply rinsing in saline. The data are shown in the TABLE V below. Saline rinse without rubbing was used to measure the amount of protein on the lens before cleaning. Five discs per protein per treatment were used.

TABLE V

| | Protein (micrograms) remaining on disc | | |
|---|---|---|---|
| Protein | after saline rinse | after rubbing by foam | after rubbing by pad |
| mucin | 0.56 ± .15 | 0.23 ± .04 | 0.11 ± .02 |
| lysozyme | 1.04 ± .04 | 0.67 ± .12 | 0.32 ± .02 |
| gamma globulin | 1.48 ± .25 | 0.81 ± .12 | 0.32 ± .10 |
| albumin | 3.15 ± .43 | 1.71 ± .05 | 1.07 ± .20 |

The results of TABLE V show that much more of the protein is removed by the article of the invention than by the polyurethane foam article.

EXAMPLE 6

Cleaning contact lens materials

Discs of a contact lens material used in Example 4 were dried by gentle blotting; they were then soiled (in duplicate) with various potential eye contaminants as shown in TABLE VI. One disc of each pair was cleaned by adding 10 drops by Allergan TM Cleaning and Disinfecting Solution and rubbing between the index finger and thumb of one hand 10 times on each side.

The second disc of each pair was placed on a 2.8 mm thick by 5.1×7.6 cm pad of Doodle Duster TM which had been moistened with 10 drops of the same solution as above. The disc was rubbed 10 times between the forefinger and the thumb.

All discs were then rinsed on each side with a five second stream of Allergan Hydrocare TM Preserved Saline. The discs were blotted dry and scored blind by three observers on a scale of 1 to 5 (dirty to clean). The data for each disc were averaged and the results are shown in TABLE VI.

TABLE VI

| Contaminant | Finger rub | Pad rub |
|---|---|---|
| 1. perfume - Emeraude TM (Coty, N.Y.C, NY) | 1.7 | 4.7 |
| 2. eye shadow (Helena Rubenstein, NY) | 1.3 | 4.7 |
| 3. Dial TM aerosol deodorant (Armour-Dial, Inc., Phoenix, AZ) | 1.7 | 3.7 |
| 4. Revlon TM liquid makeup (Revlon, Inc., N.Y.C., NY) | 3.7 | 4.0 |
| 5. Maybelline Ultra Lash TM Mascara (Maybelline Co., N. Little Rock, AR) | 1.0 | 4.3 |
| 6. blusher (Estee Lauder, N.Y.C., NY) | 2.7 | 5.0 |
| 7. moisterizer (Merle Norman, Los Angeles, CA) | 4.0 | 4.7 |
| 8 petroleum jelly (Cheeseborough Ponds Inc., Greenwich, CT) | 1.0 | 4.3 |
| 9. PreSun TM skin protectant (Westwood Pharmaceuticals, Inc., Buffalo, NY) | 4.7 | 5.0 |
| 10. Aqua-net TM hair spray (Faberge, Inc., N.Y.C., NY) | 4.7 | 4.3 |
| 11. Erase TM (Max Factor, Hollywood, CA) | 1.7 | 4.7 |

The data of TABLE VI show that in all cases except contaminant 10 (hair spray) using a non-woven fibrous pad in the cleaning process gave better results than rubbing between the fingers.

EXAMPLE 7

Preparation and use of rectangular polyethylene pad

A sheet of polyethylene blown microfibers (estimated fiber diameter 10 microns or less) of about 1 mm thickness was folded into three layers. A pad 20 mm wide by 5.5 cm long was cut from the sheet. This size was sufficient to cover a soft contact lens when the pad was folded over the lens. The pad was moistened with a 0.5 percent aqueous solution of Hamposyl TM L-30. This size pad was found to function well and allowed for scrubbing (i.e., cleaning) of a soft contact lens.

EXAMPLE 8

Preparation and use of polyester pads

A sheet of poly(ethylene terephthalate) blown microfibers (estimated fiber diameter 10 microns) of about 1 mm thickness was folded into layers and six pads of various sizes and conformations as shown in TABLE VII below were cut from the sheet.

TABLE VII

| Sample | Conformation | Layers | Sizes (mm) |
|---|---|---|---|
| 1 | Square | 3 | 50 × 50 |
| 2 | Circle | 2 | 25 (diameter) |
| 3 | Rectangle | 3 | 20 × 80 |
| 4 | Rectangle | 3 | 30 × 80 |
| 5 | Rectangle | 3 | 20 × 55 |
| 6 | Rectangle | 3 | 26 × 78 |

Each of the pads was moistened with a 0.5 percent aqueous solution of Hamposyl TM L-30. The pads were tested to assess their utility in rubbing the lens in a circular motion. All were useful, but some differences were observed. The two-layer pad was noticeably more flimsy than the three layer pads. Those pads which were larger than needed to cover the lens were generally perceived as unnecessarily large.

EXAMPLE 9

Two-pad method of cleaning

A sheet of poly(ethylene terephthalate) blown microfiber web (about 1 mm thickness) was folded into two layers and a square of about 3.8 cm per side was cut. A square of about 5.1 cm per side was cut and wrapped around an index finger. The 3.8 cm pad was placed in the palm of the other hand and both pads were soaked with Allergan TM LC-65 solution. The lens was placed in the palm, centered on the pad and rubbed with the other pad. This method was found to be useful for both hard poly(methyl methacrylate) and soft contact lenses.

EXAMPLE 10

One-pad method of cleaning

A sheet of poly(ethylene terephthalate) blown microfiber web of about 1 mm thickness was folded into two layers and a rectangular pad of about 2.5 cm by 6.2 cm was cut and soaked in Allergan TM LC-65 Solution. A lens was placed in the center of the pad and the pad was folded over the lens. The lens was rubbed between the thumb and the index finger of one hand. This method was found to be useful for cleaning of both hard poly(methyl methacrylate) and soft contact lenses.

EXAMPLE 11

Scratching comparison

The size and number of scratches on two hard poly(methyl methacrylate) lenses were compared. One lens had been in normal use by a person for about five years. The other had been rubbed for a total of one hour using five-minute continuous rubbing intervals with the same poly(ethylene terephthalate) microfibrous pad (2.5 mm thick×3.8 cm×3.8 cm) of the invention. The lens was examined after each 5-minute rub to determine the number and type of scratches that resulted from rubbing with the pad. This rubbing time is estimated to be about equivalent to one year of use if a lens were cleaned once per day for about 10 seconds.

The data are shown in TABLE VIII below.

TABLE VIII

| | Human worn lens | | | | Lens rubbed with pad | | | |
|---|---|---|---|---|---|---|---|---|
| | | | Range of | | | | Range of | |
| | Number of scratches | Av. length | width in microns | depth in microns | Number of scratches | Av. length | width in microns | depth in microns |
| Heavy scratches | 15 | 0.86 mm ±0.36 | 2.2–4.4 | less than 1.2 | 4 | 1.5 mm ±1.18 | 2.2–2.4 | less than 1.2 |
| Medium scratches | 21 | 1.26 mm ±0.88 | 1.0–1.3 | less than 0.6 | 5 | 2.14 mm ±1.94 | 1.5–1.7 | less than 0.8 |
| Fine scratches | 21 | 1.27 mm ±0.75 | 0.4–0.8 | less than 0.4 | 2 | 1.7 mm (only one data point) | 0.5 | less than 0.3 |

The data of TABLE VIII show that the human worn lens had more scratches, and the scratches produced by the pad were about equal to or less than those from normal wear in averages for width, depth, and length.

EXAMPLE 12

Packaged article (peel-openable)

In order to package the moist non-woven fibrous pad of the invention a package allowing for an extended shelf life (up to two years or more) is desired. A package was constructed having an upper sheet-like portion and a lower sheet-like portion. The upper portion was called the printed film and had four layers. From the outside to the inside these layers consisted of: 1 sheet of bleached Kraft paper (11.4 kilos per m²), 0.0018 cm thick polyethylene film, 0.00089 cm thick aluminum foil, 0.0051 cm thick polyolefin C-79 sealant (4-layered film available from Ludlow Co., Needham Heights, MA). The lower portion, called the unprinted film, also had four layers. From the outside to the inside these layers consisted of: 1 sheet of bleached Kraft paper (11.4 kilos per m²), 0.001 cm thick polyethylene film, 0.00089 cm thick aluminum foil, and 0.022 cm thick Surlyn TM 1652 film (Dupont Co., Wilmington, DL) (4-layered film available from Ludlow Co.).

A bag maker machine was supplied with an aluminum heat seal platten to seal the two layers together. The platten had a 30° chevron design with a seal of 3.2 cm length and imprint width of 0.3 cm dimensions: width, 3.81 cm (1.5 inch) (inner); length, 8.9 cm (3.5 inch) (inner). The package was prepared with the flat end open. Twelve such packages were prepared. An embossed poly(ethylene terephthalate) blown microfiber pad (2.5 cm×6.4 cm×1.1 mm) was then inserted into each package. The pad was then treated with 2.0 ml of 0.5 percent Hamposyl TM L-30 aqueous solution. The package end was then heat-sealed.

EXAMPLE 13

Alternative packaged article

A tear-open package can be prepared using the printed and unprinted layers of Example 12 but substituting polyethylene film or Surlyn TM 1652 film for the C-79 sealant. This package gives a welded sealed that can be torn open (rather than peeled back).

EXAMPLE 14

Cleaning of contact lens material with embossed and pillowed fibrous webs

Twenty discs of about 12 mm diameter and about 0.3 mm thickness were cut from a sheet of polymeric lens material used in Example 4 and were rubbed until black on both sides with mascara (Maybelline Ultralash TM).

The discs were air-dried for one hour. Then the discs were cleaned using three types of microfibrous web pads (5.1×5.1 cm) by rubbing ten times on each side using one pad per lens. Each pad was soaked with 1 ml of surfactant (0.1% of Hamposyl TM L-30 in saline, pH 7.4) solution immediately before use. Five discs were cleaned with each type of pad. The types of pad used were (1) polypropylene pillow web (0.5 mm thick, 1 ml surfactant), (2) embossed polystyrene web (1.2 mm thick, 1.5 ml surfactant), and (3) embossed poly(ethylene terephthalate) web (1.1 mm thick, 1.0 ml surfactant).

In addition, five discs were cleaned using the standard finger rubbing technique. Ten drops of Allergan TM LC-65 solution per disc were dropped onto the disc in the palm of the hand and the disc was rubbed ten strokes per side.

The cleanliness of each disc was then scored by six people. The scale was 1 to 3, with 3 being cleanest.

The results are shown in TABLE IX:

TABLE IX

| | Cleanliness score (Average of 5 discs) | | | | | |
|---|---|---|---|---|---|---|
| Pad type | person A | person B | person C | person D | person E | person F |
| (1) | 2.8 | 3.0 | 2.4 | 3.0 | 2.0 | 2.4 |
| (2) | 2.6 | 2.8 | 2.6 | 2.8 | 2.0 | 2.6 |
| (3) | | 2.2 | 2.2 | 2.2 | 2.0 | 2.2 |
| Finger + LC-65 | 1.0 | 1.0 | 1.0 | 1.0 | 1.0 | 1.0 |

The results of TABLE IX show that all of the microfibrous web pads of the invention cleaned the lens discs much better than the standard cleaning method.

EXAMPLE 15

A lens of the silicone methacrylate type (Polycon TM, Syntex Ophthalmics, Inc., Phoenix, AZ) was cleaned by rubbing in the hand for 20 seconds with Allergan TM LC-65 Solution. It was then examined at seven times magnification through an eyepiece. The number and placement of scratches was noted. The lens was then rubbed for 60 minutes (30 minutes on each side of the lens) with a polyethylene blown microfiber pad (3.8×3.8 mm×2 mm thick) loaded with Allergan TM LC-65 (contact lens cleaner). Only one significant scratch was observed (posterior) at ten times magnification.

EXAMPLE 16

Bags constructed of Scotchpak TM ET 29308 (3M, St. Paul, MN) were used to package the moist microfibrous pad of the invention. The inner dimensions of each bag were 7 cm×7 cm.

A microfibrous pad of poly(ethylene terephthalate) (6.35 cm×2.5 cm×1.1 mm thick) was placed inside each bag and 1.0 ml of Cyclopol TM SBFA-30 in standard saline (pH 7.4) was added. The bag was then heat-sealed at the top opening. Six bags were made in this way.

EXAMPLE 17

Cleaning with scrimmed microfiber pad

Ten discs of the contact lens material used in Example 4 (12 mm diameter, 0.25 mm thickness) were rubbed until black with Maybelline Ultralash TM mascara, and then they were allowed to dry for one hour.

A scrimmed microfiber pad prepared by embossing together a blown microfiber web of polypropylene fibers (estimated as 10 micron fiber diameter) and spun bond polypropylene (estimated as 20 micron fiber diameter) was obtained. It was cut into square pieces 5.1 cm×5.1 cm×0.76 mm thick. Each square was loaded with surfactant by soaking in 0.1 percent Hamposyl TM L-30 saline solution immediately before use. One square was placed in the palm of the hand, a disc was centered on the square and another square was wrapped around the index finger of the other hand. The disc was rubbed using the square wrapped around the index finger, 10 strokes on each side of the disc. Good cleaning was obtained as determined by three individuals. The cleaning with pad was compared to cleaning by the standard digital rubbing technique (see Example 14) with lens cleaning solution. The pad was found to be greatly superior.

EXAMPLE 18

In order to evaluate the correlation between fiber diameter, fiber type, and scratching of a lens material the polymer samples shown in the following table were utilized. The lens material used was poly(methyl methacrylate). For each evaluation a rectangular specimen measuring 8.9 cm×9.5 cm×0.34 mm thick was taped onto a microscope stage. Under the microscope a clear area relatively free of scratches was found and land-marked. That area was photographed using 50× magnification and transmitted light. A sample of non-woven web of about 5.1 cm×5.1 cm was folded over four times to provide a rectangle of about 2.5 cm×2.5 cm. This rectangular sample was wrapped around the end of a cotton swab and taped firmly in place. The wrapped swab was soaked in Allegan TM LC 65 Cleaning Solution until dripping wet. The swab was then rubbed over the test area with a firm stroke for sixty seconds. After swabbing, the test area was again photographed. Scratches within a 4 $mm^2$ area were measured.

TABLE X

| Sample No. | Polymer/ preparative process | Average fiber diameter (microns) (number measured) | Scratches (Category/ length in mm) | Web (description of non-uniform areas) |
| --- | --- | --- | --- | --- |
| 1 | polystyrene/ solution blown | 0.68 ± .43 (32) | 6 FINE/0.35 ± .32 | 25 spheres/$mm^2$; 20 to 180 micron diameter |
| 2 | nylon 6/ melt blown | 1.9 ± 2.1 (37) | 15 FINE/0.29 ± .17 | 2 jumbo** fibers/$mm^2$; 90 × 101 microns; several areas with parallel twisted fibers |
| 3 | poly(ethylene terephthalate)/ melt blown | 2.8 ± 1.4 (30) | 7 FINE/1.1 ± .85 | 2 jumbo fibers/4 $mm^2$; 640 × 100 microns |
| 4 | polypropylene/ melt blown | 2.7 ± 2.1 (32) | 0 | 2 overlap areas/4 $mm^2$; one area with parallel twisted fibers |
| 5 | polypropylene/ spun bond | 20.28 ± .17 (18) | 1 HEAVY/2.28 2 MEDIUM/2.28 27 FINE/0.1 to 2.28 | 6 overlap areas/16 $mm^2$ |
| 6 | poly(ethylene terephthalate) with latex binder/carded web | 16.4 ± 3.9 (21) | 3 FINE/0.39 ± .13 | 1 overlap area/16 $mm^2$ |
| 7* | polypropylene-poly(ethylene terephthalate) bi-component/spun fiber (non-web form) | 31.1 ± 4.6 (19) | 5 FINE/0.60 ± .24 | fibers uniform/4 $mm^2$ |
| 8 | polypropylene/ spun fiber (non-web form) | 49.5 ± 11.5 (20) | 1 MEDIUM/1.5 15 FINE/0.88 ± .68 | 1 jumbo fiber/16 $mm^2$; 160 × 300 microns |
| 9+ | polypropylene (PP) with poly(ethylene terephthalate) (PET) staple fiber | 10(PP) 40(PET) | 7 FINE/0.21 ± .04 | |

*sample 7 and 8 in non-web form were fibers wound in a bundle around the cotton swab
**jumbo means fiber greater than 90 microns in diameter
+Doodle Duster TM (fiber measurements from manufacturer's literature)

Sample no. 4, melt-blown polypropylene fibers of less than 10 micron diameter, gave superior results. Samples nos. 1, 3, 6, 7 and 9 representing different polymeric compositions with fiber diameters up to 40 microns, gave good results.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article comprising a thermoplastic, polymeric, non-woven fibrous web having an average fiber diameter up to 50 microns and the web further comprises a surfactant physiologically acceptable to the eye, said article being a contact lens cleaner.

2. The article according to claim 1 wherein said web is microfibrous and has a fiber diameter up to 10 microns.

3. The article according to claim 1 wherein said surfactant is anionic.

4. The article according to claim 1 wherein said fibrous web is selected from webs consisting of polyethylene, polypropylene, polyamide, polystyrene, polyester, polyurethane, and copolymers, combinations, and blends thereof.

5. The article according to claim 1 contained in a sterile package.

6. The article according to claim 1 wherein said web is embossed or pillowed.

7. The article according to claim 1 further comprising an aqueous moistening composition.

8. The article according to claim 7 wherein said aqueous moistening composition is water.

9. The article according to claim 4 wherein said web is polyethylene.

10. The article according to claim 4 wherein said web is polyester.

11. The article according to claim 1 wherein said non-woven fibrous web is selected from the group consisting of polyalkylene, polyvinyl chloride, polyamide, polystyrene, polyarylsulfone, polyester, polyurethane, and combinations, blends and copolymers thereof.

12. The article according to claim 1 wherein said non-woven fibrous web has at least 80 percent voids.

13. The article according to claim 1 prepared by a melt-blowing technique.

14. A package comprising: an article comprising: a low linting, thermoplastic, polymeric, non-woven fibrous web having an average fiber diameter up to 50 micrometers, and the web further comprises a surfactant physiologically acceptable to the eye, said article being a contact lens cleaner.

15. The package according to claim 14 wherein said web of said article is microfibrous and has a fiber diameter up to 20 microns.

16. The package according to claim 14 wherein said web of said article is microfibrous and has a fiber diameter up to 10 microns.

17. The package according to claim 14 wherein said non-woven fibrous web of said article is selected from the group consisting of polyalkylene, polyvinyl chloride, polyamide, polystyrene, polyarylsulfone, polyester, polyurethane, and combinations, blends and copolymers thereof.

18. The package according to claim 14 wherein said non-woven fibrous web of said article is selected from webs consisting of polyethylene, polypropylene, polystyrene, polyester, polyurethane, polyamide, and combinations, blends and copolymers thereof.

19. The package according to claim 14 further comprising a surfactant.

20. The package according to claim 19 wherein said surfactant is anionic.

21. The package according to claim 14 wherein said article is sterile.

22. The package according to claim 14 wherein said non-woven fibrous web of said article has at least 80 percent voids.

23. The package according to claim 14 wherein said web of said article is prepared by a melt-blowing technique.

24. A roll of packages of the contact lens cleaning articles according to claim 14.

25. The package according to claim 14 further comprising an aqueous moistening composition.

* * * * *